(12) United States Patent
Hamada et al.

(10) Patent No.: US 8,690,363 B2
(45) Date of Patent: Apr. 8, 2014

(54) VEHICLE MIRROR DEVICE

(75) Inventors: Takehiro Hamada, Aichi-ken (JP);
Masami Kato, Aichi-ken (JP);
Masatsugu Ohashi, Aichi-ken (JP);
Masao Ayabe, Aichi-ken (JP); Yasunori Hirosawa, Okazaki (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 105 days.

(21) Appl. No.: 13/338,600

(22) Filed: Dec. 28, 2011

(65) Prior Publication Data

US 2012/0188662 A1  Jul. 26, 2012

(30) Foreign Application Priority Data

Jan. 24, 2011 (JP) ................................. 2011-012201

(51) Int. Cl.
*G02B 7/18* (2006.01)
(52) U.S. Cl.
USPC ........................................................ 359/514
(58) Field of Classification Search
USPC ................ 359/514, 871–878; 248/475.1–488
See application file for complete search history.

(56) References Cited

U.S. PATENT DOCUMENTS

| 4,278,227 | A  | * | 7/1981 | Davis et al. ................... 248/487 |
| 4,514,060 | A  | * | 4/1985 | Mittelhauser ................. 248/476 |
| 5,198,929 | A  | * | 3/1993 | Clough ......................... 359/513 |
| 6,932,415 | B1 | * | 8/2005 | Van Houzen et al. ...... 296/146.2 |
| 7,758,010 | B2 | * | 7/2010 | Tanaka ........................ 248/475.1 |
| 2012/0033313 | A1 | * | 2/2012 | Herrmann et al. ............ 359/872 |
| 2012/0119053 | A1 | * | 5/2012 | Sugisaka et al. .............. 248/479 |

FOREIGN PATENT DOCUMENTS

| FR | 2711594 A1 * | 5/1995 | ............... B60R 1/06 |
| JP | 2004-098790 | 4/2004 | |
| JP | 2005-178594 | 7/2005 | |
| JP | 2008-254552 | 10/2008 | |
| JP | 2009-202715 | 9/2009 | |

* cited by examiner

*Primary Examiner* — Euncha Cherry
(74) *Attorney, Agent, or Firm* — Roberts Mlotkowski Safran & Cole P.C.

(57) ABSTRACT

In a vehicle door mirror device, a base is attached to a door and covered with a base cover. A gasket is disposed on a door panel of the base cover, a seal portion of the gasket seals a gap between a lower side end of the base cover and the door panel. The seal portion is extended from the gasket toward the base cover side. Therefore, even if a dimension of the gap between the lower side end of the base cover and the door panel varies, the lower side end of the seal portion can be suppressed from being separated from an outer periphery of the base cover toward the inner side, the base cover can be suppressed from looking floating from the door panel, and appearance of the gap between the lower side end of the base cover and the door panel can be improved.

10 Claims, 4 Drawing Sheets

VEHICLE MIRROR DEVICE

CROSS-REFERENCE TO RELATED APPLICATION

This application claims priority under 35 USC 119 from Japanese Patent Application No. 2011-012201 filed Jan. 24, 2011, the disclosure of which is incorporated by reference herein.

BACKGROUND OF THE INVENTION

1. Field of the Invention

The present invention relates to a vehicle mirror device in which a gap between a vehicle body side and a covering member is sealed by a seal portion.

2. Related Art

In a door mirror disclosed in Japanese Patent Application Laid-Open No. 2008-254552, a base is attached to a vehicle body door panel, and the base is covered with a base cover. The base cover at the vehicle body door panel side is sealed by a packing.

In the door mirror such as mentioned above, an extended portion is integrally formed in a whole outer periphery of the packing, and the extended portion seals a gap between the vehicle body door panel and the base cover.

In this case, the extended portion is extended toward an inner periphery side (inner side) of the packing as the extended portion goes from the packing to the vehicle body door panel side. Particularly in a case of a small gap between the vehicle body door panel and the base cover, an end portion, on the vehicle body door panel side, of the extended portion is largely separated toward the inner periphery side (inner side) from the outer periphery of the base cover. Therefore, an appearance of the gap between the vehicle body door panel and the base cover is degraded because the base cover looks in a state of floating from the vehicle body door panel.

SUMMARY OF THE INVENTION

An object of the invention is to obtain a vehicle mirror device that improves appearance of a gap between a vehicle body side and a covering member.

A vehicle mirror device according to a first aspect of the present invention includes: a support member that is provided on a vehicle body; a main body at which a mirror is provided, the main body being supported by the support member; a covering member that covers the support member, a gap being formed between the covering member and the vehicle body; a sealing member that is disposed at a vehicle body side of the covering member; and a seal portion that seal the gap, the seal portion being provided at the sealing member to extend from the sealing member toward a covering member side.

A vehicle mirror device according to a second aspect of the present invention includes: a support member that is provided on a vehicle body; a main body at which a mirror is provided, the main body being supported by the support member; a covering member that covers the support member, a gap being formed between the covering member and the vehicle body; a sealing member that is disposed at a vehicle body side of the covering member; and a seal portion that seals the gap, the seal portion being provided at the sealing member, wherein a position in the seal portion, at which position the seal portion comes into contact with the covering member, is changed according to a variance in a dimension of the gap.

A vehicle mirror device according to a third aspect of the present invention includes: a support member that is provided on a vehicle body; a main body at which a mirror is provided, the main body being supported by the support member; a covering member that covers the support member, a gap being formed between the covering member and the vehicle body; a sealing member that is disposed at a vehicle body side of the covering member; and a seal portion that seals the gap, the seal portion being provided at the sealing member, wherein a vehicle body side end of the seal portion is displaced toward an outer side of the sealing member according to decrease in a dimension of the gap.

In a vehicle mirror device according to a fourth aspect of the present invention, in the vehicle mirror device according to any one of the first to third aspects, a through-hole is formed in the seal portion at a position corresponding to a corner portion in an outer periphery of the sealing member.

It is possible that, in any one of the first aspect to the fourth aspect, the seal portion is extended in a direction such that the seal portion goes toward an inner side of the sealing member as the seal portion goes toward the covering member side, from an outer periphery end of the sealing member.

Further, it is possible that, in any one of the first aspect to the fourth aspect, a vehicle body side end of the seal portion serving as the outer periphery end of the sealing member comes into contact with the vehicle body, and a part of the seal portion, which is located further than the vehicle body side end toward the covering member side, comes into contact with a vehicle body side end portion of the covering member.

In the vehicle mirror device according to the first aspect, the main body is supported by the support member that is provided at the vehicle body (a member provided at the vehicle body or a portion of the vehicle body), and the mirror is provided at the main body. The support member is covered with the covering member, and the gap is formed between the vehicle body and the covering member.

The sealing member is disposed on the vehicle body side of the covering member, and the seal portion of the sealing member seals the gap between the vehicle body and the covering member.

At this point, the seal portion is extended from the sealing member toward the covering member side. Therefore, a vehicle body side end of the seal portion can be suppressed from being separated from an outer periphery of the covering member toward an inner periphery side (inner side), the covering member can be suppressed from looking floating with respect to the vehicle body, and the appearance of the gap between the vehicle body and the covering member can be improved.

In the vehicle mirror device according to the second aspect, the main body is supported by the support member that is provided at the vehicle body, and the mirror is provided at the main body. The support member is covered with the covering member, and the gap is formed between the vehicle body and the covering member.

The sealing member is disposed on the vehicle body side of the covering member, and the seal portion of the sealing member seals the gap between the vehicle body and the covering member.

At this point, the position in the seal portion, at which position the seal portion comes into contact with the covering member, is changed according to the varying in dimension of the gap between the vehicle body and the covering member. Therefore, even if the dimension of the gap between the vehicle body and the covering member varies, a vehicle body side end of the seal portion can be suppressed from being separated from an outer periphery of the covering member toward an inner periphery side (inner side), the covering member can be suppressed from looking floating with respect to the vehicle body, and the appearance of the gap between the vehicle body and the covering member can be improved.

In the vehicle mirror device according to the third aspect, the main body is supported by the support member that is provided at the vehicle body, and the mirror is provided at the main body. The support member is covered with the covering member, and the gap is formed between the vehicle body and the covering member.

The sealing member is disposed on the vehicle body side of the covering member, and the seal portion of the sealing member seals the gap between the vehicle body and the covering member.

At this point, the vehicle body side end of the seal portion is displaced toward the outer side of the sealing member according to the decreasing in dimension of the gap between the vehicle body and the covering member. Therefore, even if the dimension of the gap between the vehicle body side and the covering member varies, a vehicle body side end of the seal portion can be suppressed from being separated from an outer periphery of the covering member toward an inner periphery side (inner side), the covering member can be suppressed from looking floating with respect to the vehicle body side, and the appearance of the gap between the vehicle body side and the covering member can be improved.

In the vehicle mirror device according to the fourth aspect, the through-hole is formed in the seal portion at the position corresponding to the corner portion in the outer periphery of the sealing member. Therefore, the generation of what is called slippage (wrinkle) can be suppressed in the seal portion at the position corresponding to the corner portion in the outer periphery of the sealing member, and degrading of the sealing property of the gap between the vehicle body and the covering member by the seal portion at the position corresponding to the corner portion in the outer periphery of the sealing member can be suppressed.

BRIEF DESCRIPTION OF THE DRAWINGS

Embodiments of the invention will be described in detail with reference to the following figures, wherein:

FIG. 1A is a view showing a large gap dimension between a door panel and a base cover, and FIG. 1B is a view showing a small gap dimension between the door panel and the base cover;

FIG. 2A is a view showing a whole of the gasket, and FIG. 2B is a view showing a main part of the gasket;

DETAILED DESCRIPTION OF THE INVENTION

Figure 3:
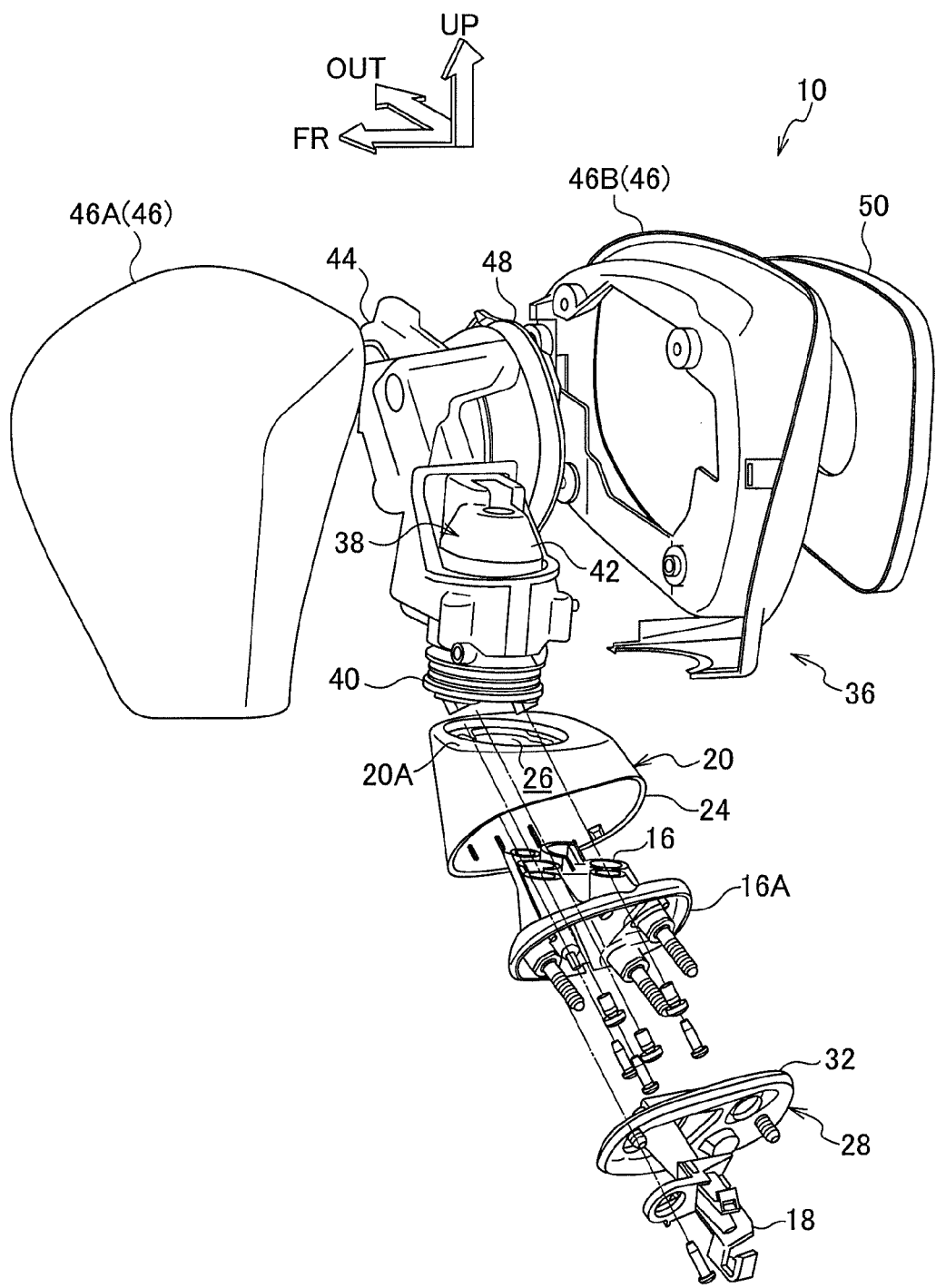
FIG. 3 is an exploded perspective view showing the vehicle door mirror device of the embodiment when viewed from an inner side in a vehicle width direction and a vehicle front side.
Figure 4:
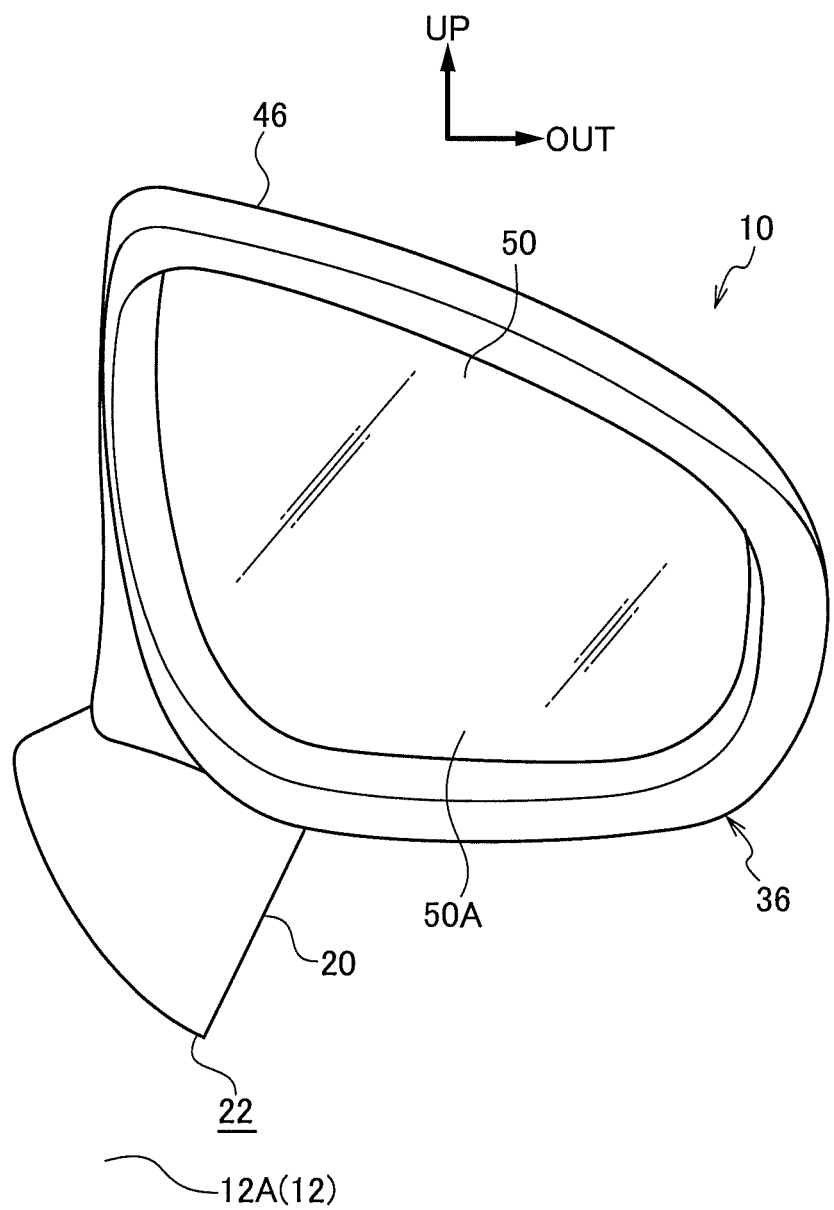
FIG. 4 is a perspective view showing the vehicle door mirror device of the embodiment when viewed from a vehicle rear side and a vehicle upper side.

FIG. 3 is an exploded perspective view showing a vehicle door mirror device 10 to which a vehicle mirror device according to an embodiment of the invention is applied when viewed from an inner side in a vehicle width direction and a vehicle front side, and FIG. 4 is a perspective view showing the vehicle door mirror device 10 when viewed from a vehicle rear side and a vehicle upper side. In the drawings, a forward direction of a vehicle is indicated by an arrow FR, an outward direction in a vehicle width direction (a rightward direction of the vehicle) is indicated by an arrow OUT, and an upward direction is indicated by an arrow UP.

As shown in FIG. 4, the vehicle door mirror device 10 of the embodiment is provided at an outside portion of a door 12 (a vehicle body) of the vehicle. An outside surface in a lower portion of the door 12 is constructed by a door panel 12A (door outer panel) that is of a layout member (design member), and an attaching hole 14 (see FIGS. 1A and 1B) is formed by piercing in a front side end portion of the vehicle at an upper end of the door panel 12A.

As shown in FIG. 3, the vehicle door mirror device 10 includes a metallic, block-shaped base 16 that is of a support member in an inside end portion in a vehicle width direction. The base 16 is attached to the door 12 via the attaching hole 14, thereby attaching the vehicle door mirror device 10 to the door 12. An abutment cylinder (tube) 16A is formed in a lower side end portion of the base 16.

A resin temporary jointing pawl 18 (temporary place pawl, clamp clip) that is of a temporary jointing member (temporary place member) is attached to a lower side of the base 16. When the base 16 is attached to the door 12, the temporary jointing pawl 18 is hooked in (engaged with) the door 12 via the attaching hole 14, whereby the vehicle door mirror device 10 is temporarily jointed (placed) to the door 12 to suppress a position misalignment of the vehicle door mirror device 10 with respect to the door 12 and dropout of the vehicle door mirror device 10 from the door 12.

Figure 1A:
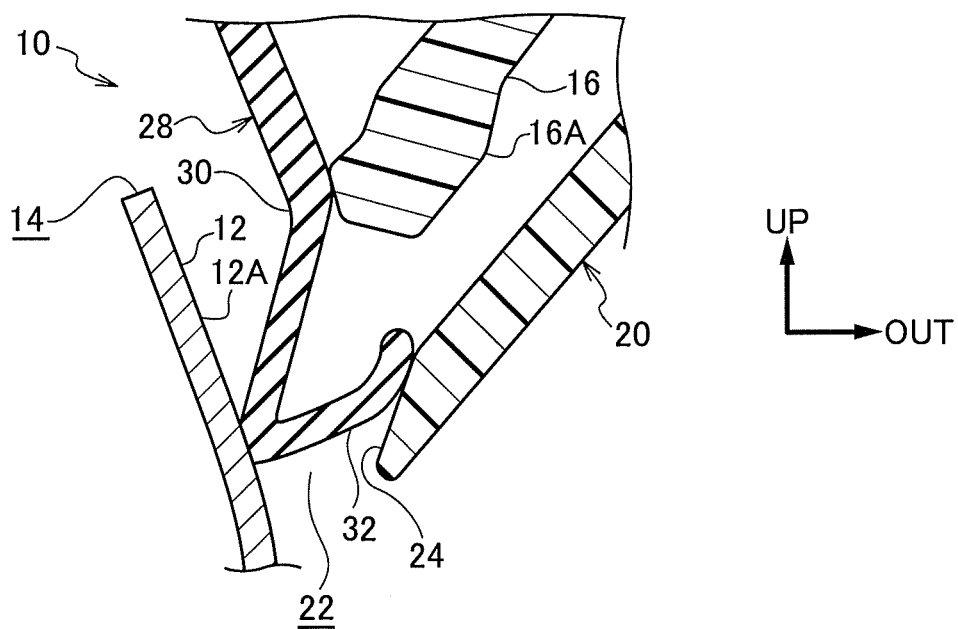
FIGS. 1A and 1B are sectional views showing a main part of a vehicle door mirror device according to an embodiment of the invention.
Figure 1B:
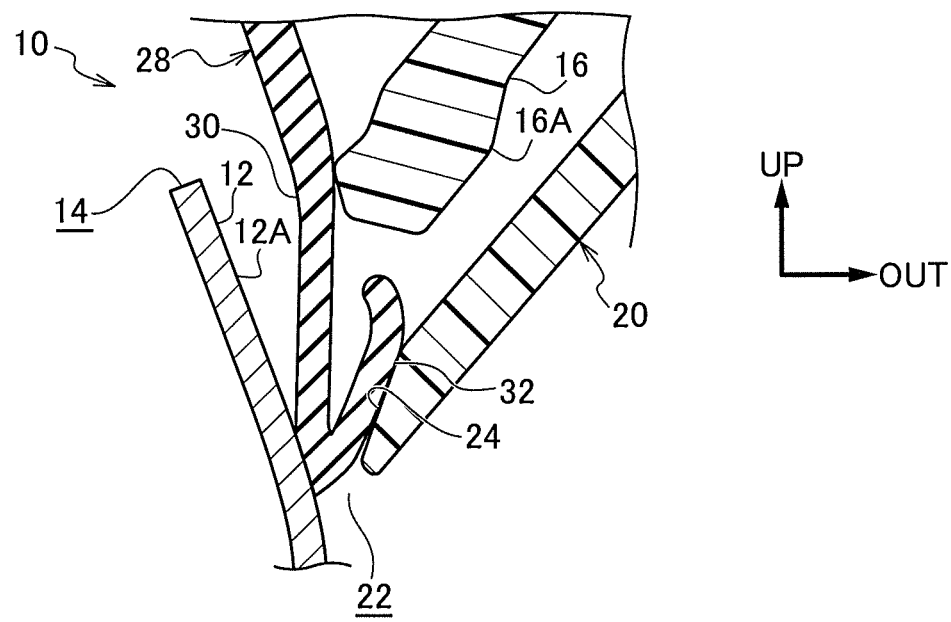

An outer periphery of the base 16 is covered with a resin, substantially cylindrical base cover 20 that is of a covering member (design member), and the interior of the base cover 20 is opened downward. As shown in FIGS. 1A and 1B, in all-round (full circumference), a lower side end of the base cover 20 faces an outer circumference side of the attaching hole 14 of the door panel 12A, and a gap (space) 22 is formed between the door panel 12A and the lower side end of the base cover 20. In all-round, a seal surface 24 is formed in an inner periphery side portion (inner surface portion) at the lower side end (vehicle body side end) of the base cover 20, and the seal surface 24 is inclined upward (opposite side of the door panel 12A side) as the seal surface 24 goes to the inner periphery side (inner side, center side) of the base cover 20.

As shown in FIG. 3, an upper wall 20A is provided at an upper end of the base cover 20, and the upper wall 20A is arranged vertically to an up-down direction. An exposure hole 26 is formed by piercing in the upper wall 20A, and the exposure hole 26 exposes the base 16 upward.

A substantially plate-like gasket 28 (seal) that is of a seal member is provided on a lower side of the base 16, and the gasket 28 is disposed between the base 16 and the temporary jointing pawl 18, and attached to the base 16 by the temporary jointing pawl 18. The gasket 28 made of rubber has elasticity and a sealing property, and the lower side surface of the base cover 20 is covered with the gasket 28.

As shown in FIGS. 1A and 1B, in all-round, a bent portion 30 (curved portion) is formed in the gasket 28 near an outer periphery (outer periphery end) of the gasket 28. The gasket 28 is, on the outer periphery end side from the bent portion 30, inclined downward (the side of the door panel 12A) as the gasket 28 goes toward the outer periphery end side, and the gasket 28 abuts on the abutment cylinder 16A of the base 16 at the bent portion 30.

In all-round, a plate-like seal portion 32 is integrally formed at the outer periphery end of the gasket 28, and the seal portion 32 is extended in a direction such that the seal portion 32 goes toward the inner periphery side (inner side, center side) of the gasket 28 as the seal portion 32 goes upward (the base cover 20 side, the side opposite to the door panel 12A side) from the outer periphery end of the gasket 28. That is, a tip end of the seal portion 32 is at the side of the base cover 20 side and a base end of the seal portion 32 is at the side of the panel door 12A side. The lower side end (the base end) of the seal portion 32 (the outer periphery end of the gasket 28) is press-contacted to the door panel 12A and the upper side portion (a portion further to the tip end side than the base end side) of the seal portion 32 is press-contacted to the seal surface 24 of the base cover 20, whereby the gap 22 between the lower side end of the base cover 20 and the door panel 12A is sealed in all-round of the base cover 20. Therefore, water or the like is suppressed (prevented) from invading into the door 12 through the gap 22 and the attaching hole 14, and generation of a wind-noise caused by the invasion of wind into the base cover 20 through the gap 22 during vehicle running is suppressed.

Figure 2A:
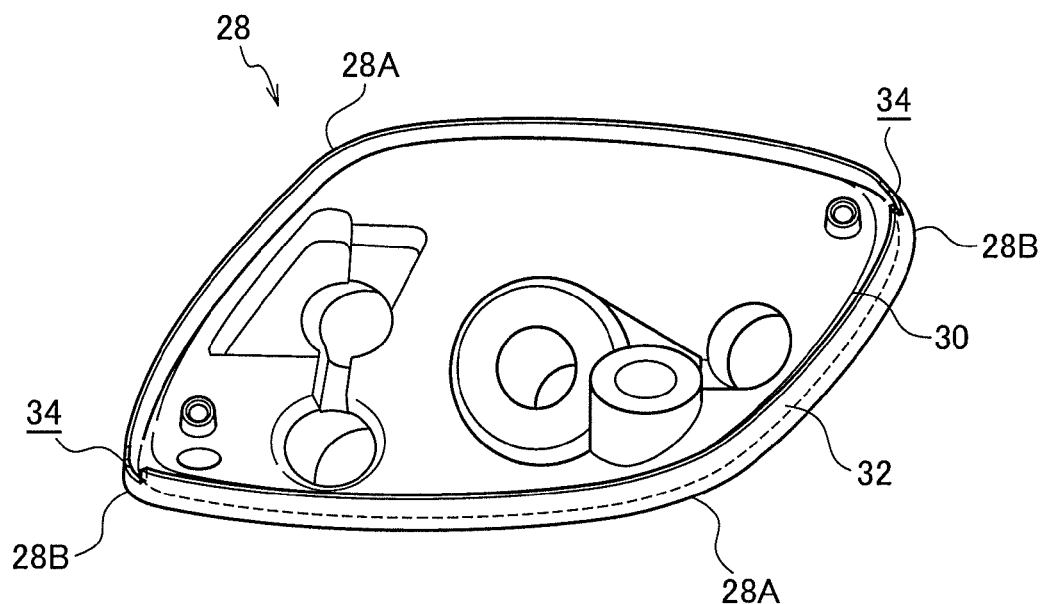
FIGS. 2A and 2B are perspective views showing a gasket of the vehicle door mirror device of the embodiment.
Figure 2B:
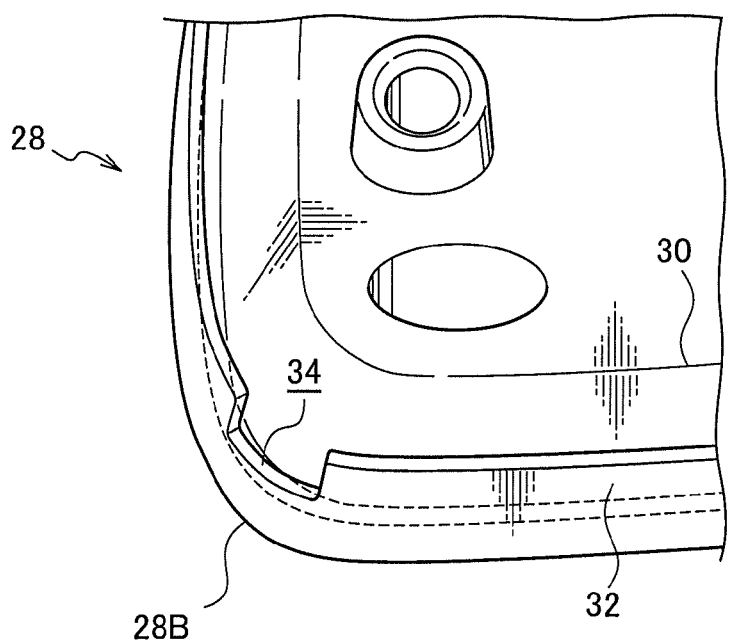

As shown in FIGS. 2A and 2B, the gasket 28 is formed into a substantial parallelogram shape in a plan view, and a pair of large angle portions 28A whose interior angle is larger than 90° and a pair of small angle portion 28B whose interior angle is equal to or smaller than 90° are provided at corner portions at the outer periphery of the gasket 28. A rectangular slit 34 (step portion) that is of a through-hole is formed by piercing in the seal portion 32 in each small angle portion 28B of the gasket 28, and the slit 34 is opened from the upper side end of the seal portion 32.

As shown in FIG. 3, at the upper side of the base 16, a main body 36 is supported, and a housing device 38 (retractor) that is of a housing section is provided at the main body 36.

The housing device 38 includes a metallic stand 40 that is of a support portion, and the stand 40 is attached to the base 16 through the exposure hole 26 of the base cover 20, whereby attaching the housing device 38 to the base 16. The upper wall 20A of the base cover 20 is sandwiched between the stand 40 and the base 16, thereby fixing the base cover 20 to the base 16.

The stand 40 supports a driving body 42 constituting a turning body, and the driving body 42 is turned with respect to the stand 40 when the housing device 38 is driven.

A frame 44 constituting the turning body is fixed to and supported by the driving body 42 of the housing device 38. The frame 44 is projected outward in the vehicle width direction with respect to the base 16 and stood (deployed). The frame 44 can be turned integrally with the driving body 42 when the housing device 38 is driven. The frame 44 is turned toward the vehicle rear side and the inside in the vehicle width direction while being integral with the driving body 42, thereby housing the frame 44 (including a mirror surface adjusting device 48, a mirror 50 and a visor 46 which will be mentioned).

The driving body 42 and the frame 44 of the housing device 38 are accommodated in the visor 46 that is of an exterior member (design member) constituting the turning body, and the visor 46 is attached to and supported by the frame 44. A substantially curved plate-like visor cover 46A is provided on a vehicle front side of the visor 46, a substantially rectangular pipe-shaped visor rim 46B is provided on a vehicle rear side of the visor 46, and the visor cover 46A and the visor rim 46B are assembled to constitute the visor 46.

The mirror surface adjusting device 48 (drive unit) that is of a mirror surface adjusting section constituting the turning body is fixed to the vehicle rear side of the frame 44, and the mirror surface adjusting device 48 is inserted in the visor rim 46B of the visor 46.

The substantially rectangular plate-like mirror 50 constituting the turning body is assembled on the vehicle rear side of the mirror surface adjusting device 48, and the mirror 50 is accommodated in the visor rim 46B of the visor 46 in a state in which a mirror surface (mirror finished surface) 50A is oriented toward the vehicle rear side (see FIG. 4). When the mirror surface adjusting device 48 is driven, the mirror 50 is tilted by the mirror surface adjusting device 48 to adjust an angle of the mirror surface 50A of the mirror 50.

An operation of the embodiment will be described below.

In the vehicle door mirror device 10 having the above configuration, the base 16 is attached to the door 12 through the attaching hole 14, and the base 16 is covered with the base cover 20.

The gasket 28 is disposed on the door panel 12A side of the base cover 20, and the seal portion 32 of the gasket 28 seals the gap 22 between the lower side end (the seal surface 24) of the base cover 20 and the door panel 12A.

At this point, the seal portion 32 is extended from the gasket 28 toward the base cover 20 side (upper side: the side opposite to the door panel 12A side). Accordingly, even if a dimension of the gap 22 between the lower side end of the base cover 20 and the door panel 12A is decreased due to an assembly error of the door panel 12A in the door 12 or an attaching error of the base 16 to the door 12, a position in the seal portion 32 at which position the seal portion 32 comes into contact with the lower side end of the base cover 20 is changed and displacing of the lower side end (the vehicle body side end) of the seal portion 32 (the outer periphery end of the gasket 28) is suppressed, and even when the lower side end of the seal portion 32 (the outer periphery end of the gasket 28) is displaced, a bending of the gasket 28 in the bent portion 30 is decreased so that the lower side end of the seal portion 32 is displaced toward the outer periphery side (outer side) of the gasket 28 (namely, in the state as shown in FIG. 1B, compared with the state as shown in FIG. 1A, the lower side end of the seal portion 32 is displaced in a direction toward the outer side of the gasket 28 (the lower side in FIG. 1B)).

Therefore, even when the dimension of the gap 22 between the lower side end of the base cover 20 and the door panel 12A varies, the lower side end of the seal portion 32 can be suppressed from being separated from the outer periphery of the base cover 20 toward the inner periphery side (inner side), the base cover 20 can be suppressed from looking floating from the door panel 12A, and the appearance of the gap 22 between the lower side end of the base cover 20 and the door panel 12A can be improved.

The slit 34 is formed by piercing in the seal portion 32 in each of the pair of small angle portions 28B of the gasket 28. Therefore, the generation of what is called slippage (wrinkle) can be suppressed in the seal portion 32 in each small angle portion 28B of the gasket 28, and degrading of the sealing property of the gap 22 between the lower side end of the base cover 20 and the door panel 12A by the seal portion 32 at the position corresponding to each small angle portion 28B of the gasket 28 can be suppressed.

In the embodiment, the slit 34 is formed by piercing in the seal portion 32 in the small angle portion 28B of the gasket 28. Alternatively, the slit 34 may be formed by piercing in the seal portion 32 in the large angle portion 28A of the gasket 28.

In the vehicle mirror device of the embodiment of the invention is applied to the vehicle door mirror device 10. Alternatively, the vehicle mirror device of the embodiment of the invention may be applied to another vehicle outer mirror device outside the vehicle (such as a vehicle fender mirror device) or a vehicle inner mirror device inside the vehicle.

What is claimed is:

1. A vehicle mirror device comprising:
a support member that is provided on a vehicle body;
a main body at which a mirror is provided, the main body being supported by the support member;
a covering member that covers the support member, a gap being formed between a vehicle body side end portion of the covering member and the vehicle body;
a sealing member that is disposed at a vehicle body side of the covering member; and
a plate-like seal portion that seals the gap by a part at a tip end side in an extending direction of the seal portion being press-contacted to the vehicle body side end portion of the covering member,
the seal portion being provided at the sealing member, and the seal portion extending, from an outer periphery end of the sealing member, in a direction such that the seal portion goes toward an inner side of the sealing member as the seal portion goes toward the covering member side.

2. The vehicle mirror device of claim 1,
wherein a position in the seal portion, at which position the part of the seal portion comes into contact with the covering member, is changed according to a variance in a dimension of the gap.

3. The vehicle mirror device of claim 1, wherein,
wherein a vehicle body side end of the seal portion is displaced toward an outer side of the sealing member according to decrease in a dimension of the gap.

4. The vehicle mirror device of claim 1, wherein a through-hole is formed in the seal portion at a position corresponding to a corner portion in an outer periphery of the sealing member.

5. The vehicle mirror device of claim 2, wherein a through-hole is formed in the seal portion at a position corresponding to a corner portion in an outer periphery of the sealing member.

6. The vehicle mirror device of claim 3, wherein a through-hole is formed in the seal portion at a position corresponding to a corner portion in an outer periphery of the sealing member.

7. The vehicle mirror device of claim 1, wherein:
a vehicle body side end of the seal portion serving as the outer periphery end of the sealing member comes into contact with the vehicle body.

8. The vehicle mirror device of claim 1, wherein a bent portion is formed at the sealing member, and a vehicle body side end of the support member is abutted at the bent portion, the sealing member being bent at the bent portion such that the sealing member goes toward the vehicle body side as the sealing member goes toward the outer periphery end side of the sealing member of the bent portion.

9. The vehicle mirror device of claim 1, wherein a surface of the vehicle body side end portion of the covering member is inclined such that the surface goes toward a side opposite to the vehicle body side as the surface goes toward an inner side of the covering member.

10. The vehicle mirror device of claim 1, wherein the seal portion is integrally connected to the sealing member in a V-shaped joint, and is elastically biased toward the covering member from the V-shaped joint.

* * * * *

UNITED STATES PATENT AND TRADEMARK OFFICE
CERTIFICATE OF CORRECTION

PATENT NO. : 8,690,363 B2  
APPLICATION NO. : 13/338600  
DATED : April 8, 2014  
INVENTOR(S) : Takehiro Hamada et al.

Page 1 of 1

It is certified that error appears in the above-identified patent and that said Letters Patent is hereby corrected as shown below:

On the Title Page: Item (73) should read as:

Assignee: KABUSHIKI KAISHA TOKAI-RIKA-DENKI-SEISAKUSHO
Aichi-Ken, JP

TOYOTA JIDOSHA KABUSHIKI KAISHA
Aichi-Ken, JP

Signed and Sealed this
Twenty-fourth Day of February, 2015

Michelle K. Lee
*Deputy Director of the United States Patent and Trademark Office*